United States Patent

[11] 3,596,522

[72] Inventor Donald L. Ensley
 San Leandro, Calif.
[21] Appl. No. 719,133
[22] Filed Apr. 5, 1968
[45] Patented Aug. 3, 1971
[73] Assignee Harvest Queen Mill & Elevator Co.
 Dallas, Tex.

[54] SECOND SOUND MEASUREMENT OF ABSOLUTE ROTATIONAL MOTION
16 Claims, 2 Drawing Figs.

[52] U.S. Cl. .................................................. 73/505
[51] Int. Cl. .................................................. G01p 3/00
[50] Field of Search ........................................ 73/505

[56] References Cited
UNITED STATES PATENTS
3,395,270 7/1968 Speller ........................ 73/505 X Primary Examiner—James J. Gill
Attorney—Richards, Harris & Hubbard ABSTRACT: A method and apparatus for measuring absolute rotational motion by producing entropy waves in liquid helium II filling a cylindrical container rotationally mounted with respect to a fixed reference. A carbon resistance heater generates an entropy wave beam to a beam splitter where it is divided into two beams progressing oppositely through the liquid helium II at a speed independent of the angular velocity of the container. Reflectors attached to the container reflect the two oppositely directed beams to a detector station where the sense and magnitude of any phase difference between the beams actuates a phase detector. The phase detector produces a signal proportional to the sense and magnitude of the phase difference to a servo loop coupled to adjust the rotational motion of the container.

PATENTED AUG 3 1971

3,596,522

INVENTOR
DONALD LUTHER ENSLEY

Richards, Harris & Hubbard
ATTORNEY

3,596,522

SECOND SOUND MEASUREMENT OF ABSOLUTE ROTATIONAL MOTION

BACKGROUND OF THE INVENTION

This invention relates to the measurement of absolute rotational motion, and more particularly to the measurement of absolute rotational motion by means of entropy waves generated in liquid helium II.

In sensing motion such as displacement, velocity or acceleration, various systems have been devised for generating electrical functions which are dependent in magnitude on the character of the motion and are keyed in dependence upon the direction or sense of the motion. Such systems usually employ a supported mass as a reference element for indicating relative motion. Various light radiating and optical systems have been provided for measuring the sense and magnitude of the rotational motion of the supported mass. Typical of such systems is one wherein polarized light passes through a housing moving relative to the supported mass and is then focused on a light responsive device.

A type of ring laser has also been described as a method of detecting absolute rotational motion. However, such systems lack accuracy due to low sensitivity and instability against dimensional change.

In accordance with the present invention, absolute rotational motion is measured by means of an entropy wave transmitted through liquid helium II maintained at a temperature on the order of 0.5° K. to 2.2° K. The entropy waves are generated by a heater centrally located within the liquid helium II bath. A beam splitter divides the entropy wave into two beams directed oppositely through the liquid helium II to a detector station. Any relative angular motion of the source-receiver system, with respect to the liquid helium II, causes a change in phase displacement between the two oppositely directed beams at the receiver relative to the phase shift when no angular motion is present. This phase difference is directly proportional to the angular velocity of the system relative to the at rest condition at a given temperature.

In a more specific aspect of the invention, a cylindrical container is rotationally mounted with respect to a fixed reference and contains liquid helium II maintained at a temperature of about 1.5° K. A resistance heater is energized from a 100 kHz. source and generates an entropy wave beam to a beam splitter where it is divided into two oppositely directed beams. The beam splitter is attached to the container walls. Reflectors, also attached to the container walls, reflect the oppositely directed beams to a detector station where thermocouple devices respond to the sense and magnitude of a phase difference between the oppositely directed beams. A signal generated at the detector station is amplified in a servo loop coupled to adjust the rotational motion of the cylindrical container. The motion of the container is adjusted to maintain a null or zero phase shift between the two oppositely directed beams.

It is a primary object of the present invention to provide a measuring system of absolute rotational motion free from diffusion effects of optical sensing systems. A further object of the invention is to provide a measurement of absolute rotational motion by means of entropy waves propagating through liquid helium II. It is a further object of the invention to provide a measurement of absolute rotational motion wherein an entropy wave beam is split into two beams oppositely directed to produce a phase difference proportional to angular motion.

SUMMARY

As set forth in the appended claims, this invention relates to a motion transducer wherein an entropy wave is generated in a superfluid bath and split into two oppositely directed beams. A signal proportional to the sense and magnitude of the phase difference between the two oppositely directed beams is generated at a detector station by phase responsive means.

A more complete understanding of the invention and its advantages will be apparent from the specification and claims and from the accompanying drawings illustrative of the invention.

DESCRIPTION OF THE PREFERRED EMBODIMENT

Figure 1:
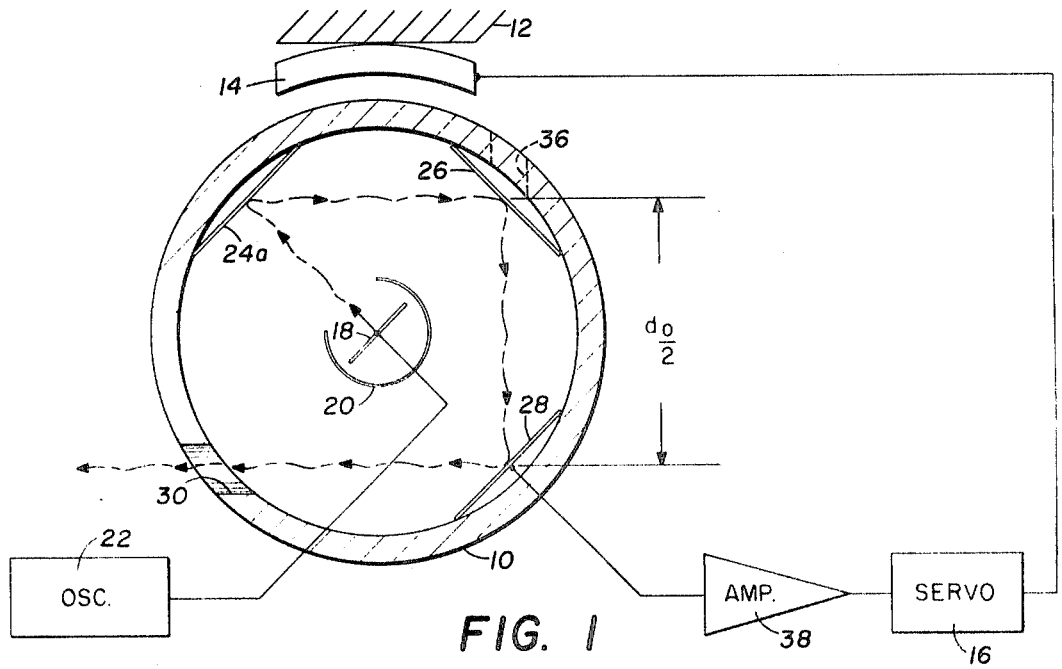
FIG. 1 schematically illustrates the top view of a system for measuring absolute rotational motion.

Referring to FIG. 1, measurement of absolute rotational motion is provided for by means of a cylindrical container 10 rotationally mounted with respect to a fixed reference surface 12, such as a space vehicle. A followup servo link 14 coupled to the output of a servo 16 controls the angular velocity of the container 10 with respect to the reference 12. A carbon resistance heater 18, centrally located within the container 10, ans surrounded by a shield 20, generates an entropy wave directed to the container walls. This heater 18 is energized from an oscillator 22 at a frequency on the order of about 100 kHz. An entropy wave propagating from the heater 18 is split into two oppositely directed beams by a beam splitter 24 attached to the inner wall of the container 10. In the top view of FIG. 1, only the clockwise directed beam is shown. After reflection from the beam splitter 24a, the clockwise directed beam is further reflected by means of a mirror 26 to a phase summing point 28. From the phase summing point 28, the clockwise directed beam passes from the container 10 through a window 30 to be dissipated in an energy absorber (not shown). The container 10 is filled with a superfluid such as liquid helium II through which the entropy wave is transmitted.

Superfluid helium, also known as liquid helium II, at temperatures below about 2.2° K. exhibits properties which are different from any known solid, liquid, or gas. Because of its peculiar behavior, liquid helium II has been said to be the only representative of a "fourth" state which cannot be identified with either the solid, liquid or gaseous states. Above a temperature of about 2.2° K., known as the "lambda" transition point, liquid helium behaves like any normal low temperature liquid. Below the lambda point, however, superfluid helium behaves in a very abnormal way which cannot be described using normal definitions of viscosity and thermal conductivity. Because of this peculiar behavior, the properties of superfluid helium are defined by what is known as the "two fluid theory." Under the "two fluid theory," the density of liquid helium II may be divided into two parts:

$$\rho = \rho_s + \rho_n \quad (1)$$

where $\rho_s$ is the superfluid component which has a negligible viscosity and $\rho_n$ is the normal component associated with a normal type viscosity. One of the most peculiar properties of superfluid helium is the negligible viscosity of the superfluid component which flows readily through very small passages on the order of about $10^{16}$ centimeters.

Another peculiarity of liquid helium II, and probably the most interesting, is the ability of the liquid to propagate two different types of waves. These are first sound, or ordinary sound, in which the superfluid and normal components move in phase with one another, and second sound in which the two components vibrate with a phase difference of 180°. Second sound is a temperature or entropy wave where the superfluid component collects at a point of low temperature while the normal component collects at a point of high temperature half a wavelength away. Second sound can be generated by periodic energizing a heating element just as first sound can be excited by periodic compression of the liquid. The periodic energization of a heating element produces temperature variations in the liquid which propagates as an entropy wave.

The kinetic energy of the internal convection heat waves can be by the equation:

$$E = \rho_s \rho_n (v_s - n)^2 / 2\rho \quad (2)$$

where $v_s$ is the velocity of the superfluid component and $v_n$ is the velocity of the normal component. In superfluid helium, the normal component propagates the heat wave in one direction and the superfluid component occurs in a counterflow direction, thus $\rho_n v_n = -\rho_s v_s$. With a periodic heat flux as generated by energizing the heater 18 the heat current is given by the equation:

$$q_o = \rho s t v_n, \quad (3)$$

where $s$ is the entropy per gram of liquid helium, and T is the bath temperature in degrees Kelvin. From the above, it can be readily shown that the characteristic velocity of a second sound of thermal wave in $$u_2^2 = (\rho_s/\rho_n) \cdot (s^2 T/c_p) \quad (4)$$

where $c_p$ is the specific heat of the liquid helium at a constant pressure.

The operation of the system of this invention is based primarily upon still another peculiar property of liquid helium II; that is, the velocity of the superfluid component remains near zero below some identifiable critical velocity of the container 10. Below the λ point transition temperature and below the critical velocity, a finite fraction of helium atoms fall into a single coherent state; this fraction increases from zero at the ** point temperature to unit at 0° K. With helium atoms in the single coherent state, the container 10 can be rotated without imparting motion to the superfluid component of the liquid helium bath. In other words, the superfluid component of the liquid helium II remains at rest so long as the container 10 rotates at an angular velocity below the critical velocity. Under these conditions, it can be said that the liquid helium II has zero coupling.

The angular motion of the superfluid component of liquid helium II below the λ point temperature takes place as quantized vortex motion as given by the expression:

$$\overline{v}_s \, \overline{dl} = n(2\pi \overline{h}/m) \quad (5)$$

where $\overline{h}$ is Plank's constant over $2\pi$, m is the rest mass of the helium atom (isotope $He^4$), $\overline{v}_s$ is the average value of the superfluid component velocity, and $n$ is an integer, which is the quantum number associated with the angular degree of freedom. For a cylinder of fluid such as container 10, the velocity of the superfluid component at any selected distance from the axis is given by:

$$v_s = \overline{h}/mr \quad 1 \quad (6)$$

where $r$ is any selected radius. The angular momentum of the superfluid component is quantized and its quantum step given by the expression:

$$\Delta S_s = \overline{h} \rho_s / m \quad (7)$$

where $\rho_s$ is the density of the superfluid component.

Before motion of the superfluid component can occur, the cylinder 10 must rotate at an angular velocity above the critical value. This critical angular velocity is given by the equation:

$$\omega_c = 15(N\overline{h}\rho_s/I\rho) \quad (8)$$

where I is the effective moment of inertia of the bath of liquid helium II, N is the total number of $He^4$ atoms/cm$^3$, and $\rho$ is the mass density of the liquid helium II. According to the equation (8), below the critical angular velocity, $\omega_c$, the liquid helium bath consists of a superfluid component which is entirely at rest. This means that for any angular velocity smaller than the critical velocity, the superfluid component of the liquid helium II does not move with the container 10.

Referring to FIG. 1, as a typical example, the container 10 includes 500 cm$^3$ of liquid helium II which has an at rest mass of 70 grams, and an effective moment of inertia of $5 \times 10^2$ grams–cm$^2$ of the container 10 is on the order of 60° per hour. For such a system, the time constant of servo 16 must be maintained below the 60° per hour figure.

Figure 2:
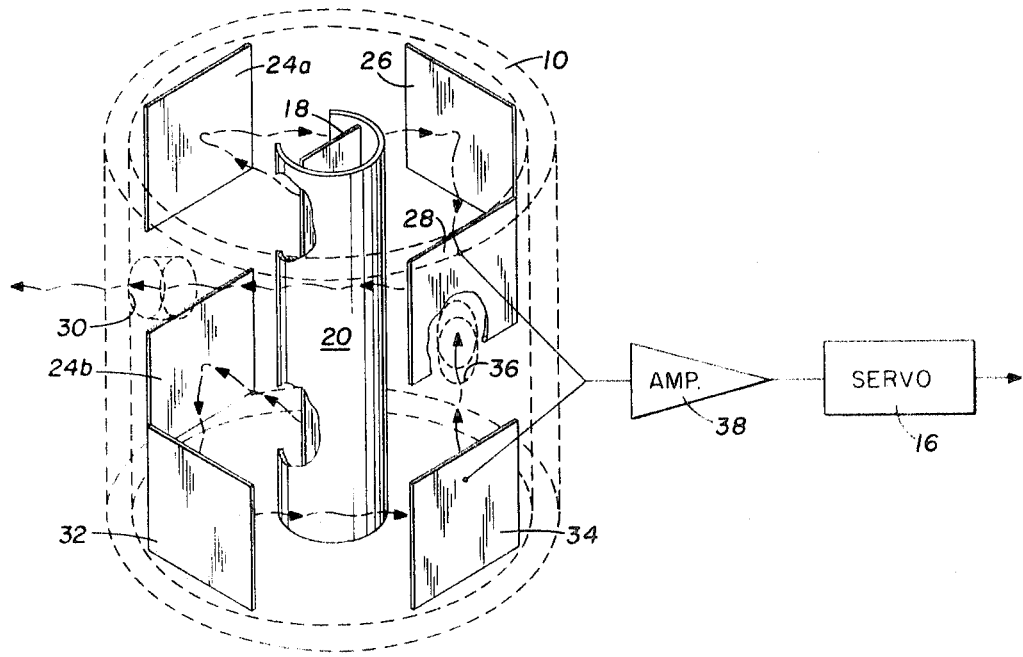
FIG. 2 is an isometric view illustrating schematically the system shown in FIG. 1.

Referring to FIG. 2, there is shown both the clockwise and counterclockwise entropy beams. The resistance heater 18 within the shield 20 generates an entropy wave to the beam splitter sections 24a and 24b to be split into two oppositely directed beams as described previously. In the upper section of the container 10, the entropy beam is directed in a clockwise direction and reflected from the mirror 26 to the phase summing point 28. At the lower portion of the container 10 a counterclockwise beam is propagated through the liquid helium and reflected from a mirror 32 to a phase summing point 34. After reflection from the summing point 28, the clockwise beam passes out of the container 10 through a window 10 and the counterclockwise beam is directed from the container through a window 36.

The phase summing points 28 and 34 comprise a detector station and are responsive to the sense and magnitude of the temperature waves impinging thereon and generate an input signal to a phase sensitive amplifier 38. The amplifier 38 in turn generates a servo input signal proportional to the sense and magnitude of the phase difference between the two oppositely directed beams propagated through the liquid helium II. This signal connects to the drive of the servo 16.

In the absence of rotation of the container 10, the time required for the oppositely directed beams to travel from the beam splitter 24 to the respective phase summing points 28 and 34 is given by the expression:

$$(\Delta T)_0 \cong d_0/u_2 \quad (9)$$

where $d_0$ is the distance from the beam splitter 24 to the phase summing points, and $u_2$ is the velocity of propagation of the temperature wave as given by equation 4. With rotation of the container 10 with respect to the liquid helium bath, that is, when the angular velocity is below the critical value, the travel time for the beams is given by the expression:

$$(\Delta T)' \cong \pm(d_0/u_2 - d_0\omega) \quad (10)$$

where $\omega$ is the rotation rate of the container relative to the liquid helium. In the above expression, the plus sign identifies the clockwise wave time and the minus sign the counterclockwise wave time for clockwise rotation of the container 10. The time difference for the two waves to reach the detector station is then equal to:

$$\delta t \cong (d_0^2 \, \omega/u_2^2) \cong (A\omega/u_2^2) \quad (11)$$

where A is the area enclosed by the container 10. From this expression one can write an equation for the phase difference between the two waves as follows:

$$\Delta\Phi = (A\omega/\lambda_2 u_2) \quad (12)$$

where $\lambda_2$ is the wavelength of the temperature wave. This phase difference is directly proportional to the angular velocity of the container 10 relative to the absolute rest position of the superfluid component of the liquid helium II. So long as the angular velocity of the container 10 remains below the critical value, this expression holds true.

The signal from the phase sensing amplifier 38, as given by the above expression, drives the servo 16 to maintain the angular velocity of the container 10 at a minimum value, thus nulling the difference between the two oppositely directed beams.

While only one embodiment of the invention, together with modifications thereof, has been described in detail herein and shown in the accompanying drawings, it will be evident that various further modifications are possible in the arrangement and construction without departing from the scope of the invention.

What I claim is:

1. A motion transducer comprising:
    a superfluid bath within a housing positionable with respect to a fixed reference, said bath having a superfluid component that remains at rest below a critical velocity of said housing,
    generator means for producing high frequency entropy waves in said bath,
    reflector means for splitting said waves into two beams oppositely directed through said bath, such that with the housing in an at rest position with respect to the fixed reference, both beams travel substantially an equal distance to a detector station, and
    means responsive to a phase difference between said beams at the detector station for generating a signal proportional to the sense and magnitude of said phase difference that varies in accordance with the change in distance travelled by said beams as a result of movement of the housing with respect to the fixed reference.

2. A motion transducer as set forth in claim 1 wherein said superfluid bath is liquid helium II maintained at a temperature on the order of 0.5° K. to 2.2° K.

3. A motion transducer as set forth in claim 2 wherein said generator means is a carbon resistance heater located within said bath.

4. A system for measuring absolute rational motion comprising:
   a container rotationally mounted with respect to a fixed reference,
   a super cold liquid having a superfluid component and a normal component filling said container, said superfluid component remaining at rest below a critical angular velocity of said container,
   generator means for producing an entropy wave in said super cold liquid,
   a beam splitter at a wall of said container and movable therewith for splitting said beam into two beams oppositely directed through said super cold liquid, such that with the container in an at rest position with respect to the fixed reference, both beams travel substantially an equal distance to a detector station, and
   means responsive to the phase difference between said oppositely directed beams at the detector station for generating a signal proportional to the sense and magnitude of said phase difference that varies in accordance with the change in distance travelled by said beams as a result of movement of the container with respect to the fixed reference.

5. A system for measuring absolute rotational motion as set forth in claim 4 wherein said super cold liquid is liquid helium II.

6. A system for measuring absolute rotational motion as set forth in claim 4 including reflector means at said container wall for reflecting said oppositely directed beams through said bath to said detector station.

7. A system for measuring absolute rotational motion as set forth in claim 6 including servo means responsive to said proportional signal for controlling the angular velocity of said container to maintain a phase null between said oppositely directed beams at the detector station.

8. A system for measuring absolute rotational motion as set forth in claim 7 wherein said servo means includes an amplifier responsive to the sense and magnitude of said proportional signal.

9. A system for measuring absolute rotational motion comprising:
   a cylindrical container rotatably mounted with respect to a fixed reference,
   liquid helium II filling said container having a superfluid component that remains at a rest velocity below a critical angular velocity of said container,
   generator means for producing an entropy wave in said bath,
   a beam splitter attached to said container for splitting said wave into two beams oppositely directed through said bath, such that with said container in an at rest position with respect to the fixed reference, both beams travel substantially an equal distance to a detector station,
   reflector means attached to said cylindrical container for reflecting said oppositely directed beams from said beam splitter to the detector station, and
   means responsive to the phase difference between said beams at the detector station for generating a signal proportional to the sense and magnitude of said difference that varies in accordance with the change in distance travelled by said beams as a result of movement of said container with respect to the fixed reference.

10. A system for measuring absolute rotational motion as set forth in claim 9 wherein said entropy wave generator is a shielded resistance heater producing a beam in a fixed direction.

11. A system for measuring absolute rotational motion as set forth in claim 10 wherein said resistance heater is energized from a 100 kHz. source.

12. A system for measuring absolute rotational motion as set forth in claim 9 including servo means coupled to said cylindrical container and responsive to said proportional signal to control the angular velocity of said container thereby maintaining a phase null between said oppositely directed beams at said detector station.

13. A system for measuring absolute rotational motion as set forth in claim 9 wherein said cylindrical container includes windows through which said oppositely directed beams pass from said cylinder after reflection from the detector station.

14. A method of measuring absolute rotational motion comprising the steps of:
   rotating a container of liquid helium II with respect to a fixed reference,
   generating an entropy wave in said liquid helium II,
   splitting said entropy wave into two beams oppositely directed through said helium II such that with the container in an at rest position both beams travel substantially an equal distance to a detector station, and
   generating a signal at the detector station proportional to the sense and magnitude of the phase difference between said oppositely directed beams that varies in accordance with the change in path length travelled by said beams as a result of rotation of the container of liquid helium II with respect to the fixed reference.

15. A method for measuring absolute rotational motion as set forth in claim 14 including nulling said phase difference by controlling the rotation of said container in response to said proportional signal.

16. A method of measuring absolute rotational motion as set forth in claim 15 including the step of absorbing said oppositely directed beams after passing from said detector station.

PO-1050
(5/69)

UNITED STATES PATENT OFFICE
CERTIFICATE OF CORRECTION

Patent No. 3,596,522            Dated August 3, 1971

Inventor(s) Donald L. Ensley

It is certified that error appears in the above-identified patent and that said Letters Patent are hereby corrected as shown below:

Col. 2, line 21, "ans" should be --and--;
       line 58, "$10^{16}$" should be --$10^{-6}$--;
       line 74, after "can be" insert --expressed--;
       line 75, "$E=\rho_s \rho_n (v_s - n)^2/2\rho$" should be
            --$E=\rho_s \rho_n (v_s - v_n)^2/2\rho$--.

Col. 3, line 8, "$q_o = \rho stv_n$" should be --$q_o = \rho sTv_n$--;
       line 12, after "in" the following was omitted: --the liquid helium is given by the equation:--;
       line 23, "** point" should be --$\lambda$ point--;
       line 23, "unit" should be --unity--;
       line 35, --$\phi$-- was omitted from beginning of Equation (5)
       line 66, after "$cm^2$" insert --. For these parameters, th critical angular velocity--.

Col. 4, line 6, "dow 10" should be --dow 30--.
Col. 5, line 10, "rational" should be --rotational--.
Col. 6, line 12, after "said" insert --phase--.

Signed and sealed this 25th day of January 1972.

(SEAL)
Attest:

EDWARD M. FLETCHER, JR.          ROBERT GOTTSCHALK
Attesting Officer                    Commissioner of Patents